United States Patent [19]

Tanaka et al.

[11] Patent Number: 4,697,445

[45] Date of Patent: Oct. 6, 1987

[54] POLY-V PULLEY FORMED OF SHEET METAL AND METHOD AND APPARATUS FOR MAKING SAME

[75] Inventors: Haruma Tanaka; Yasuo Ohashi, both of Saitama, Japan

[73] Assignee: Honda Giken Kogyo Kabushiki Kaisha, Tokyo, Japan

[21] Appl. No.: 837,534

[22] Filed: Mar. 7, 1986

Related U.S. Application Data

[62] Division of Ser. No. 708,350, Mar. 5, 1985.

[30] Foreign Application Priority Data

Mar. 7, 1984 [JP] Japan .................................. 59-42000

[51] Int. Cl.[4] .............................................. B21H 1/04
[52] U.S. Cl. ....................................... 72/68; 29/159 R
[58] Field of Search ................... 72/68, 353, 354, 370; 29/159 R; 474/170

[56] References Cited

U.S. PATENT DOCUMENTS 4,518,374 5/1985 Kanemitsu ...................... 29/159 R

FOREIGN PATENT DOCUMENTS

| 3201711 | 5/1983 | Fed. Rep. of Germany ...... 474/170 |
| 47534 | 3/1983 | Japan ................................ 29/159 R |
| 17065 | 1/1984 | Japan .................................. 474/170 |
| 1044399 | 9/1983 | U.S.S.R. ................................ 72/353 |

Primary Examiner—Lowell A. Larson
Attorney, Agent, or Firm—Lyon & Lyon

[57] ABSTRACT

A poly-V pulley formed from a cup-shaped sheet metal blank by axially compressing the cylindrical portion while confined in dies to form a thickened cylindrical portion, with radially pressurized dies to prevent buckling or corrugating, and roll forming the thickened portion into the external poly-V grooves and the opposite internal surface with axially extending grooves of a convex and concave shape for maintaining the accuracy of shape and size of the poly-V grooves.

12 Claims, 14 Drawing Figures

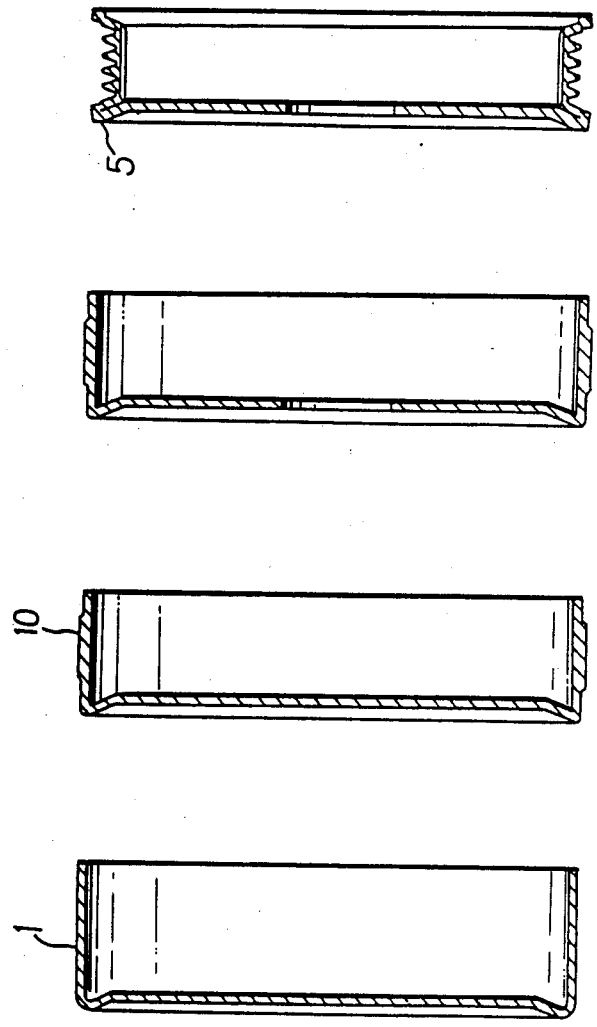

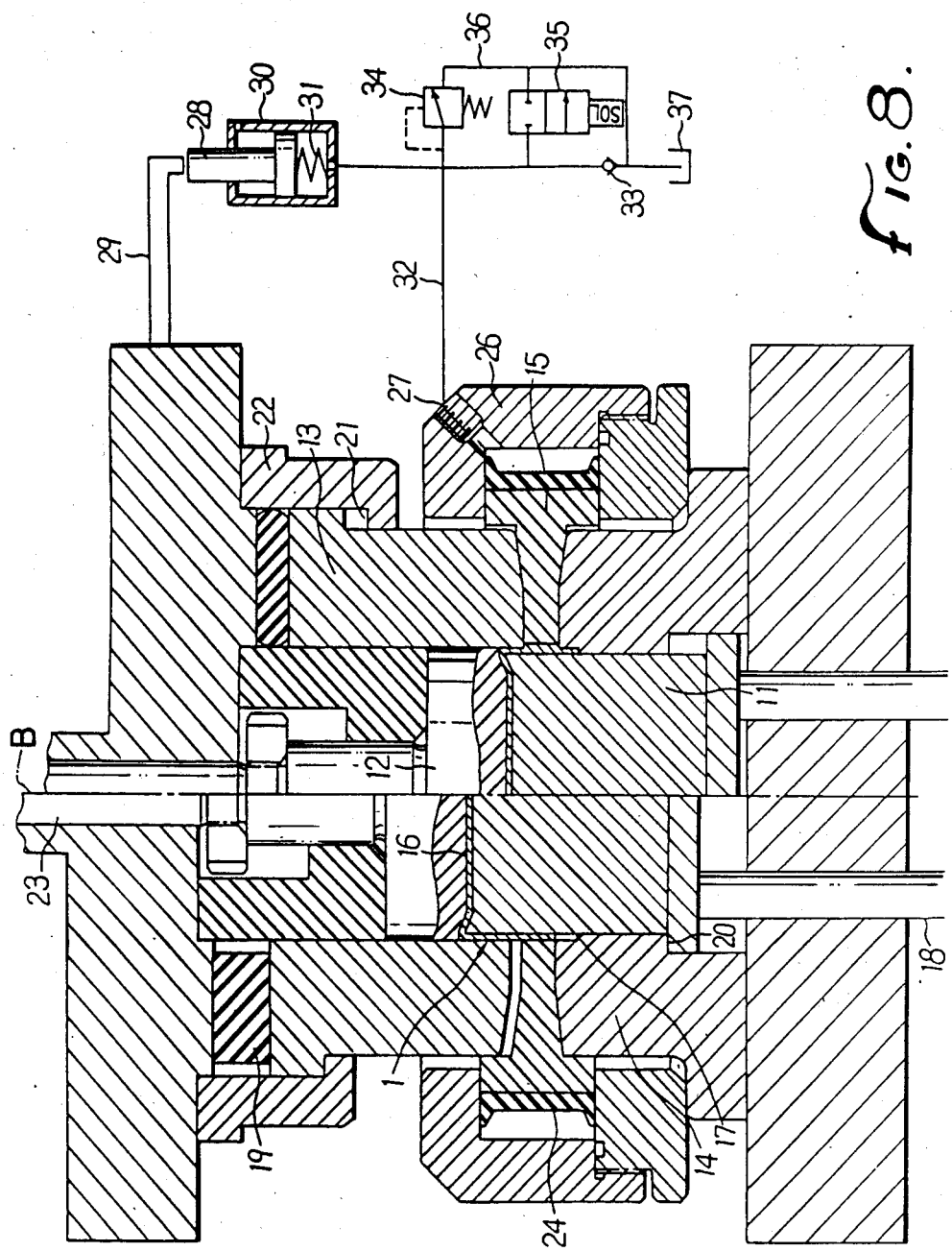

POLY-V PULLEY FORMED OF SHEET METAL AND METHOD AND APPARATUS FOR MAKING SAME

This is a division of application Ser. No. 708,350, filed Mar. 5, 1985.

The present invention relates to a poly-V pulley formed in a predetermined shape by plastic working of sheet metal material as well as the method and apparatus for making same.

Poly-V pulleys have been manufactured mainly by machining processes, but for pulleys used in large quantities there have been attempts to use manufacturing methods which utilize plastic working of a sheet metal blank. Such methods of making a poly-V pulley by plastic working of sheet metal is fairly advanced, but still unsatisfactory in point of accuracy of the V groove portion. Two such methods and the resultant pulleys are shown in U.S. Pat. Nos. 3,977,264 (Sproul) and 4,273,547 (Bytzek).

It is a primary object of the present invention to provide a poly-V pulley formed of sheet metal that is precise and consistent in both shape and dimensions. In order to achieve this object, the poly-V pulley of the present invention is characterized by having concases and convexes formed on the inner peripheral portion on the opposite side of the outer peripheral V groove portion.

According to the present invention, there are provided the method and apparatus for making a poly-V pulley by plastic working through fewer processing steps than in the prior art. Specifically, a cup-shaped or bottomed cylinder is formed by deep drawing in the conventional manner and then the cylindrical portion of the bottomed cylinder is partially thickened by axial compression with radial restraint. Next, the thus-thickened bottomed cylinder is subjected to piercing to form an accurately located central hole and mounting bolt holes. Lastly, V grooves are formed by a rolling die while simultaneously forming end flanges and the interior convex and concave surface for accurate sizing and shape.

An embodiment of the present invention will be described in detail hereinunder with reference to the drawings, wherein:

FIGS. 3 through 6 are sectional elevation views similar to FIG. 1 illustrating the shape of the pulley work piece during the successive steps of the method of this invention.

FIG. 8 is a sectional elevation view of forming apparatus illustrating on opposite sides of the center line B the start and finish of the cylinder thickening step of the method as also illustrated in FIG. 7.

Figure 1:
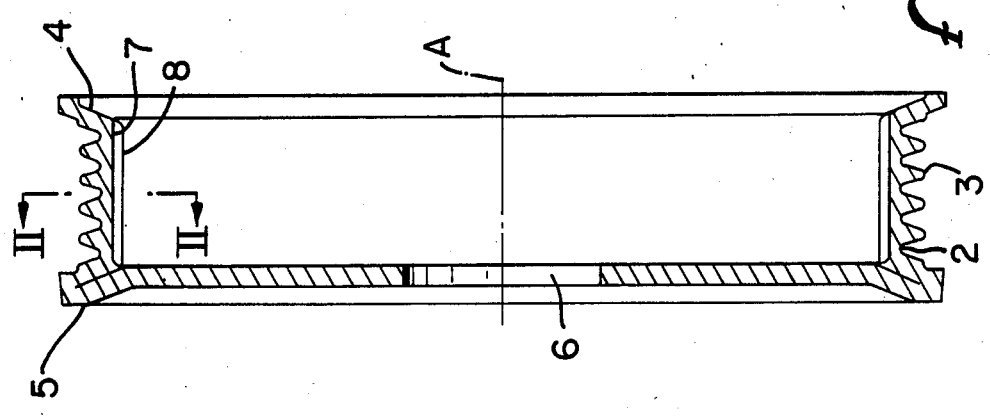
FIG. 1 is a sectional elevation view, taken substantially on the line I—I in FIG. 2, of the poly-V pulley of the present invention.

Referring first to FIG. 1, there is shown a sectional elevational view of a poly-V pulley according to an embodiment of the present invention, in which the pulley is formed of a single sheet of metal, its cylindrical portion has many V grooves 2, and at the ends of the cylindrical portion are formed a first flange portion 4 having an outside diameter larger than that fo the peaks or protrusions 3 between the V grooves and a second double-ply flange portion 5. The central portion contiguous to the flange portion 5 is a radial disc having a central hole 6. Actually, the disc normally also has plural bolt holes formed in its outer periphery and, in many cases, holes are formed for the reduction of weight. This cup-shaped pulley and the disc portion configuration are generally well known and is generally the shape of a pulley formed of a single sheet of metal.

Therefore, the improvements of the present invention resides not in the above-described shape but in the method of and apparatus for forming the pulley and the provision of many concaves and convexes on the inner peripheral portion at the back of the V grooves 2. These concaves and convexes are composed of concaves 7 and convexes 8 formed in parallel with the axis A of the pulley, as shown in the end view of the poly-V pulley of FIG. 2. These concaves and convexes contribute to the improvement of the accuracy of the V grooves in shape and dimensions. Further details on this point will be later described.

The processing method will now be described with reference to FIGS. 3 to 6. The deep drawing step to produce the cup-shaped bottomed cylinder blank or work piece 1 shown in FIG. 3 is presently well known so it will not be described herein, but it should be noted that the outside diameter of the cylindrical portion of a work piece 1 is almost equal to that of the flange portion 5 of the finished pulley shown in FIG. 1.

FIG. 4 shows a partially thickened shape of the cylindrical portion as indicated at 10. A thickening operation of this type normally is difficult and can be effected under the existing techniques if the number of processing steps is increased. But, the increase in the number of processing steps leads to an-increase of cost, so it is unusual for such thickening as shown in FIG. 4 to be adopted for commercial production. It should be noted at this point, that the present invention provides a method for performing this thickening operation in a single step.

FIG. 5 illustrates the piercing step for forming a central hole and bolt holes which is conventional and therefore a detailed explanation will be omitted.

FIG. 6 illustrates the rolling step of the present invention. One feature of this step resides in the fact that the work piece 1 that is almost equal in diameter to the resultant flange portion 5 is V-grooved by rolling while being reduced in diameter down to the final diameter of the V groove portion all in one step, thereby simplifying the entire process. Another feature resides in the fact that at the time of forming the V grooves by rolling, concaves and convexes also are formed on the inner peripheral portion opposite the V grooves to improve the accuracy of the V grooves.

An outline of the present invention is as explained above, so the processing technique will be described below in specific detail only with respect to the thickening step and the rolling step illustrated respectively in FIGS. 4 and 6 since the other steps are conventional.

Figure 7:
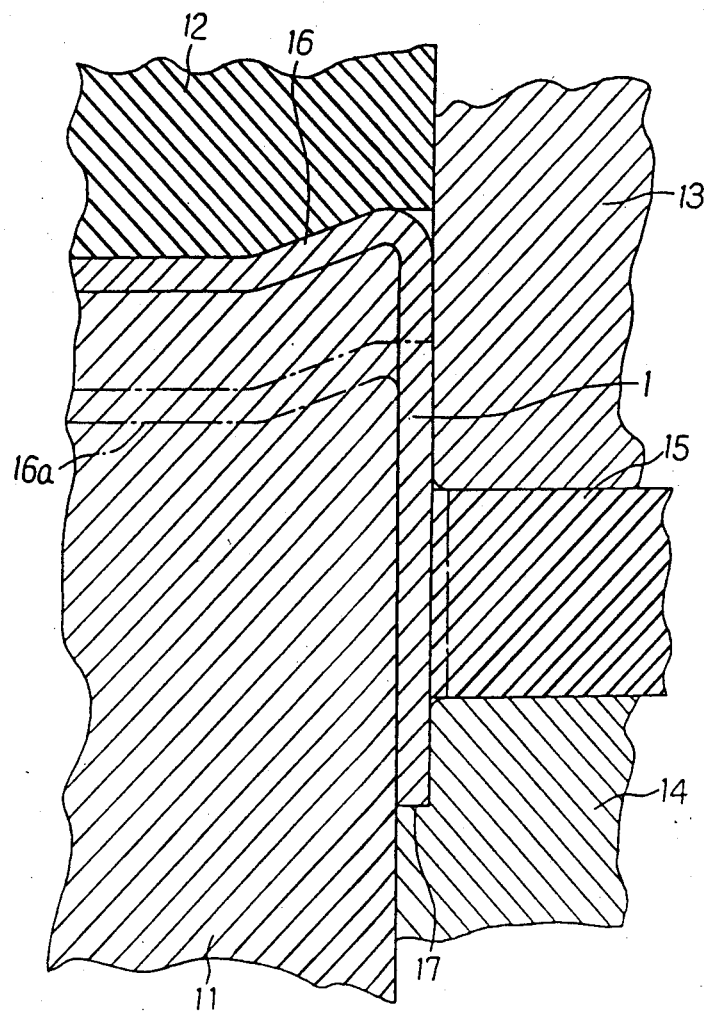
FIG. 7 is an enlarged fragmentary sectional elevation view of a forming apparatus illustrating by solid and phantom lines the start and finish of the cylinder thickening step used in the method.

The thickening method in the thickening step of FIG. 4 will first be described. In this connection, reference is made to FIG. 7 which illustrates a processing principle of this thickening method and in which the numeral 1 denotes the work piece after completion of the deep drawing illustrated in FIG. 3. A male die 11 and a knockout die 12 are movable downward while holding therebetween a bottom portion 16 of the work piece 1. The lower end portion of the work piece 1 does not move because it is in abutment with a stepped portion 17 of a fixed die 14. Consequently, as the male die 11 and the knockout die 12 move downward, the length of the cylindrical portion of the work piece 1 becomes smaller. A broken line 16a indicates the final position of the bottom portion 16 and that it has changed position. A female die 13 is disposed above the cylindrical portion of the work piece 1 that is to be thickened and a plit die 15 which can increase its diameter is located below the female die, whereby the metal of the cylindrical wall portion which is compressed or shortened by the downward movement of the dies 11 and 12 is caused to jut out in the portion surrounded by the split die 15. Of importance in this connection is that the split die 15 is held at a predetermined level of pressure toward the center to confine the metal. If this pressure is weak, both the inner and outer peripheries of the cylindrical portion will bulge, that is, bulging will result and not thickening. Thus, in order that thickening may be effected, it is necessary to precisely control the level of the said pressure.

Figure 10:
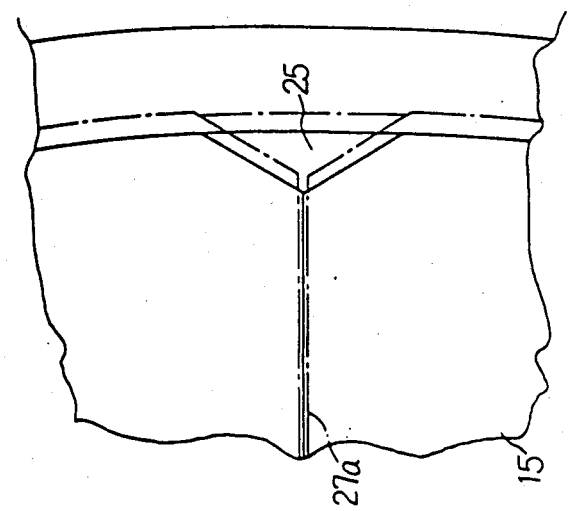
FIG. 10 is an enlarged fragmentary view of a portion of FIG. 9.
Figure 9:
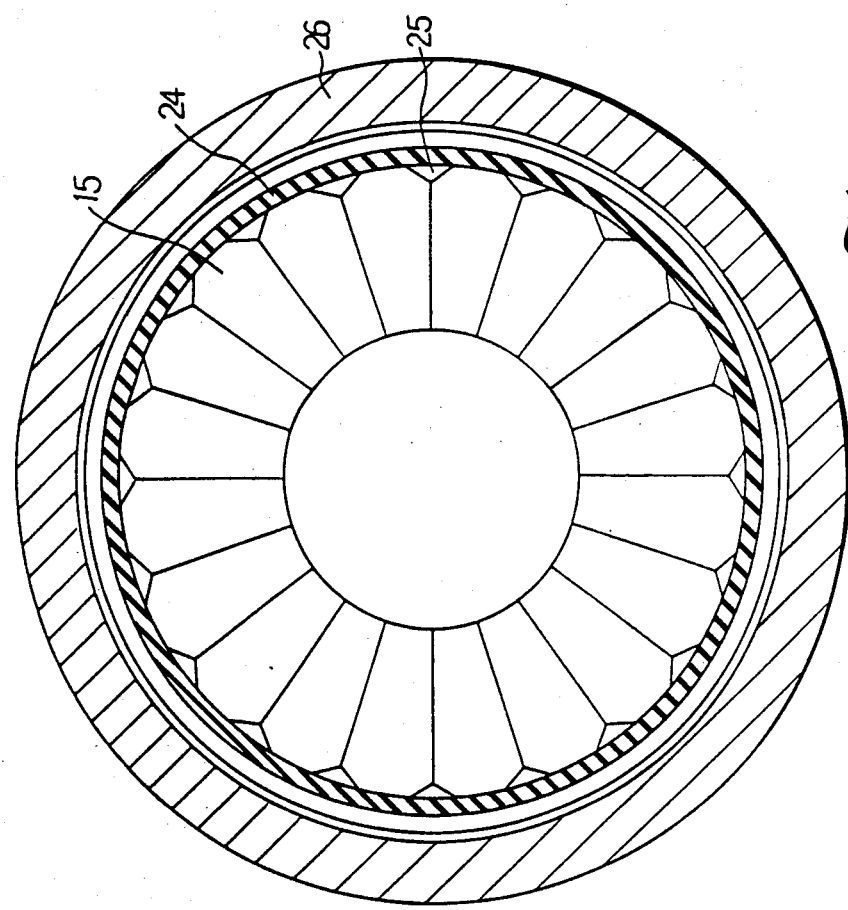
FIG. 9 is a sectional plan view of the split die, with the die elements in elevation, of the apparatus for radially restraining the sheet metal during the cylinder thickening step illustrated in FIGS. 7 and 8.

The principle of the above thickening operation for various purposes is the same as that disclosed in Japanese Patent Application No. 89076/1983 filed May 23, 1983 and entitled "Method and Apparatus for Increasing the Wall Thickness of Thin-Walled Cylinder." Therefore, an explanation is here given of specific apparatus for the application of such principle to a poly-V pulley with reference to FIGS. 8, 9 and 10. FIG. 8 is a sectional view of a thickening die, in which the left-hand side with respect to the center line B shows the condition before entering the thickening operation, while the right-hand side shows the condition at the end of the same operation. At the rightmost portion of FIG. 8 is illustrated the hydraulic controls for the split die using symbols of a hydraulic system. The functional operations will be successively described hereinunder without describing in detail the fundamental die structures that are easily understood by those skilled in the sheet metal working art.

At the beginning of the thickening operation, the work piece 1 is inserted and placed on the upper portion of the male die 11. At this time, the press ram is positioned at its top dead center so the die is largely open and the male die 11 is held in a predetermined raised position by means of a die cushion pin 18, so the insertion of the work piece is easy. Then, the ram is brought down until the bottom portion 16 of the work piece 1 is held between the knockout 12 and male die 11. At this time, the female die 13 fits on the outer periphery of the work piece 1 and places it under restraint. As the ram further descends, the lower surface of the female die 13 abuts the upper surface of the split die 15 and stops. At this time, the lower end portion of the work piece 1 is close to the stepped portion 17 of the fixed die 14. Further descent of the ram causes an elastic member 19 positioned above the female die 13 to be compressed and at the same time causes the knockout 12 to go down until the lower end portion of the work piece 1 comes into a strong pressure contact with the stepped portion 17 of the fixed die 14.

In this condition, the bottom portion 16 of the work piece 1 is pressed by the die cushion pressure to prevent deformation of this portion, and the inner periphery of the work piece 1 is restrained by the male die 11, while the upper and lower portions of its outer periphery are restrained by the female die 13 and the fixed die 14, respectively. Consequently, a further descent of the ram causes the wall of the work 1 to expand outwardly into the portion surrounded by the split die 15. In this case, if the split die 15 were not present, the cylindrical portion of the work piece 1 would bulge outwardly and the result would be the same as in the conventional bulging operation. In the present operation, the split die 15 holds the outer periphery of the work piece at a predetermined pressure to prevent bulging while allowing the excess wall portion to expand outwardly to this portion. This means that the metal of the work piece 1 has shifted to the thickened portion by an amount corresponding to the amount of contraction caused by compression of the length of the cylindrical portion.

Of importance in the above thickening step is the pressure to be applied to the split die 15 in the inward direction. If this pressure is too low, bulging will result as previously noted. At a low pressure which is not sufficiently low to allow bulging, corrugation will occur. If the pressure is too high, a large force is exerted on the die, thus causing breakage. This process is cold forging in which large forces act on the die, unlike sheet metal pressing operations such as drawing and bending. Therefore, it is necessary to accurately control the pressure of the split die 15, or there may occur problems such as breakage of the die and a poor quality of the resultant pulley. The control of the split die pressure will be described later.

The thickening operation is completed when the ram reaches its bottom dead center. Thereafter, the ram is raised for removal of the work piece 1, but before this operation it is necessary to relieve the pressure of the split die 15 which will now be described. As the ram goes up, the male die 11 also rises by virtue of the die cushion pressure. At this time, the female die 13 is pressed down by the elastic member 19, but moves up at the same speed as the male die 11 and the work piece 1 because the diameter of the thickened portion of the work piece 1 is now larger than the inside diameter of die 13 and the die cushion pressure by pins 18 is larger than that of the elastic member 19. The split die 15 also would move up if the pressure is continued to be exerted thereon. This would not only be dangerous but also it would be impossible to remove the work piece 1 in a pressurized condition of the split die 15. Thus, it is necessary to remove this pressure upon starting the ascent of the ram. By so doing, the split die 15 is held in the same position and the work piece 1 can be removed.

As the ram moves further up, the lower stepped portion of the male die 11 abuts a stepped portion 20 of the fixed die 14 and the stroke of the die cushion below the cushion pin 18 here terminates, so the male die 11 stops rising. Consequently, the ascent of the work piece 1 also stops and the female die 13 also stops in that position. Thereafter, the elastic member 19 expands with ascent of the ram until a stepped portion 21 of a guide ring 22 comes into engagement with an upper stepped portion of the female die 13, whereupon the female die 13 moves up together with the ram. At this time, the upper portion of the cylindrical portion of the work piece 1 is held between the lower portion of the female die 13 and the male die 11, but as the female die 13 moves up even further, the work piece 1 follows the female die 13 and is disengaged from the male die 11. It is not always certain the work piece 1 will come off the male die 11, but from experience it is highly probably that the work piece 1 will move up with the female die 13. If occasionally the work piece 1 still remains engaged with the male die 11 without moving up with the female die 13, then it is necessary to provide a kickout (not shown) within the male die for forcibly moving the work piece upwardly in engagement with the female die 13.

As the ram moves upwardly further to a point near the top dead center, a kickout rod 23 pushes the knockout die 12 to disengage the work piece 1 from the female die 13.

As shown in FIG. 9 which illustrates a sectional plan view of the split die 15 and its surroundings, with hatching being partially omitted, the split die 15 has a large number of segments so that the radial gaps will not be enlarged excessively with expansion of the outside diameter. The numeral 24 denotes a packing which surrounds the split die 15. The packing 24 has cross-section as shown in FIG. 8 and its diameter expands or contracts according to a change in diameter of the split die 15. While this configuration is not ideal for imposing radial force and allowing movement, it is sufficient in practical use and affords a simple structure because the amount of expansion and constraction is small. The numeral 26 denotes a cylinder which has a structure resistant to high pressures. Between the packing 24 and the cylinder 26 is formed a high pressure chamber using an oil pressure applied through passage 27 as indicated in FIG. 8. Triangular pieces 25 disposed on the outer periphery of the split die function to prevent the packing 24 from protruding into the gaps formed between segments by expansion of the split die 15. As shown in phantom lines in FIG. 10, which is an enlarged view of a portion of FIG. 9, the packing portion is kept in a hermetically sealed condition even when a gap 27a is created upon expansion in diameter of the split die 15.

In the foregoing thickening step, the split die 15 is pressurized toward the center, but this pressure must be accurately controlled. An example of means for attaining this control is diagrammatically shown on the rightmost side of FIG. 8. A piston 28 and a cylinder 30 constitute an oil pressure source which performs a pumping action. As the upper die moves down, the piston 28 is pushed downward, while when the upper die moves up, the piston 28 is returned upward by virtue of a spring 31. To attain this operation, in the illustrated embodiment the upper die has an arm 29 which engages the piston 28. This is merely for the convenience of explanation, and the arm 29 is not always present.

When the arm 29 forces the piston 28 downwardly during descent of the press ram, oil which is present below the piston 28 passes through a passage 32 and reaches the cylinder 26 and also reaches a check valve 33, a pressure regulating valve 34 and a two-way valve 35, whereby the split die 15 is moved inward in the radial direction. As the ram further descends, the split die 15 reaches the end of its movement in the radial direction just before the die starts the thickening operation. The continued downward movement of arm 29 and piston 28 produces increasing pressure in line 32. This high pressure causes the pressure regulating valve 34 to operate, so that the oil is returned to a tank 37 through a passage 36. As the ram further descends, the die starts the thickening operation. From this point in time, the diameter of the split die 15 increases, so that the oil in the cylinder 26 flows backward through the passage 32, joins the oil which is forced out by the piston 28, and enters the tank 37 through the pressure regulating valve 34. In this way, during thickening of the stock 1, the pressure acting on the split die 15 is held at a predetermined level set by the pressure regulating valve 34.

Thereafter, as the ascending motion of the ram is started, the piston 28 also moves up, so the pressure drops, but this pressure drop is not very rapid because portions of the system are in an elastically deformed state. In the present invention, in order to overcome such a disadvantage, a solenoid valve 35 is adapted to be operated in interlock with the movement of the die and is disposed in the hydraulic system, as shown in FIG. 8, whereby ideal timing can be accomplished. During the return of the piston 28 with ascent of the ram, the check valve 33 opens and the oil in the tank 37 is drawn up into the cylinder 30 in preparation for the next cycle of operation.

In the foregoing thickening method, the split die 15 can be pressurized by various methods, only one example of which has been shown and described above. As another example, the die cushion attached to the press machine may be utilized, but this pressure is very large and exceeds the pressure required for processing as the width of the thickened portion becomes large. In contrast therewith, in the above-described embodiment of the present invention utilizing oil pressure, the equipment loss and the energy loss are kept to a minimum.

Figure 11:
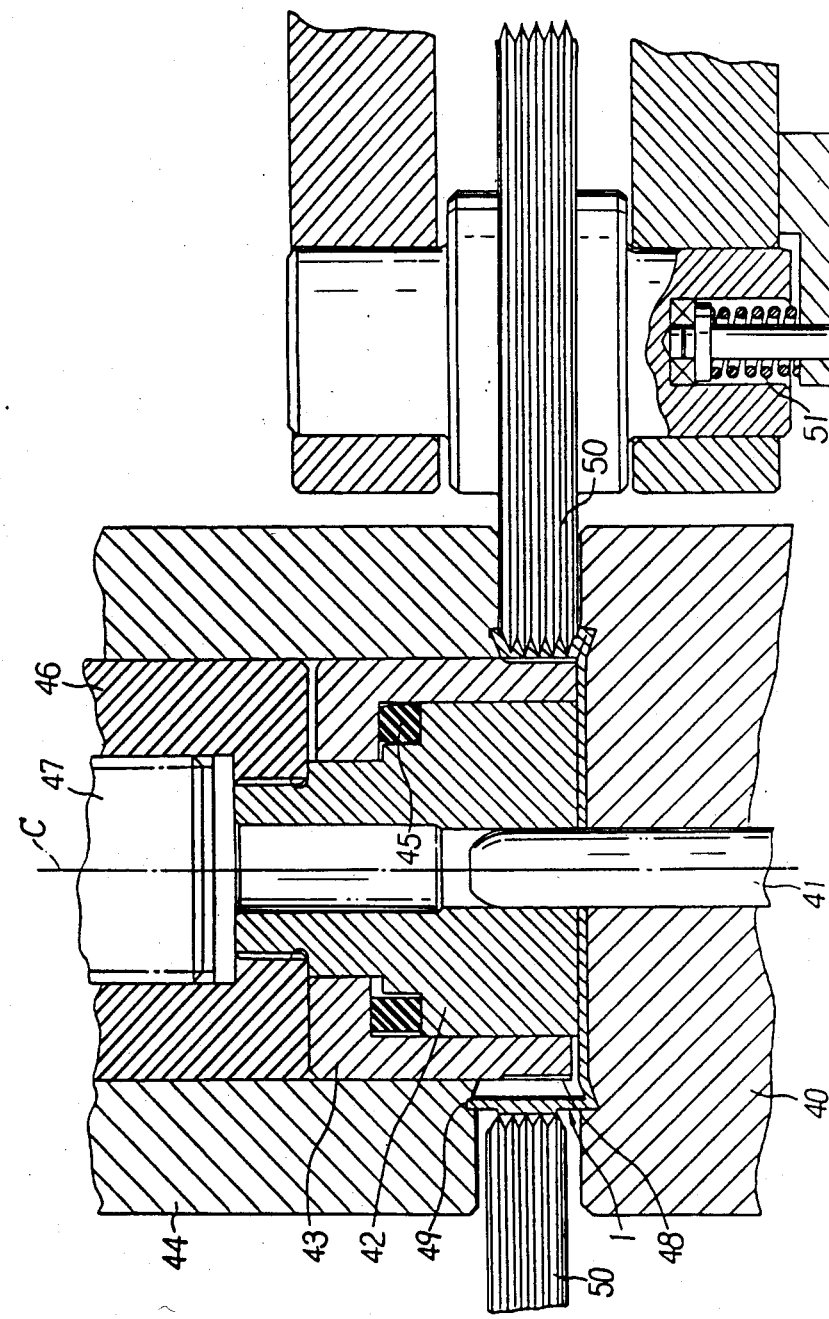
FIGS. 11 and 12 are sectional elevation views of the forming apparatus of this invention illustrating successive positions during the rolling die forms step of the method with the left side of FIG. 11 showing the starting condition, FIG. 12 showing an intermediate condition during forming, and the right side of FIG. 11 illustrating the finished condition as well as the rolling die arrangement.
Figure 12:
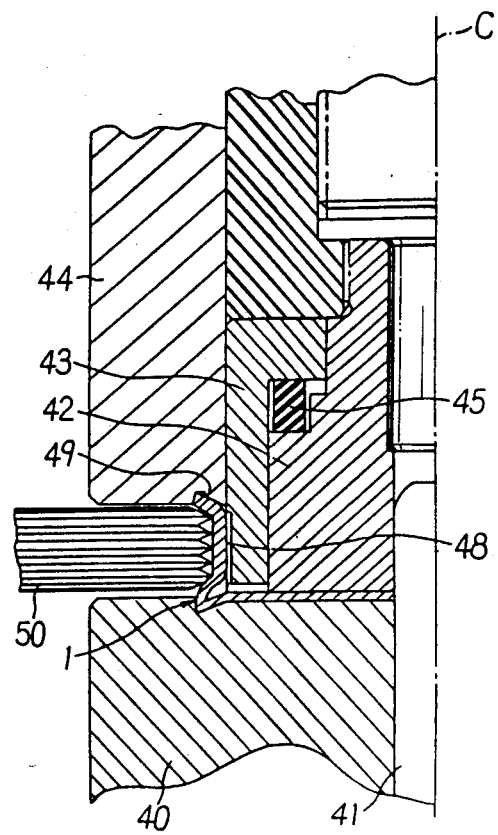

The rolling step of FIG. 6 will now be described. In FIGS. 11 and 12 which illustrate operational steps for rolling, the left-hand side with respect to a center line C in FIG. 11 shows the state before the start of rolling, while the right-hand side shows the completed state of rolling, and an intermediate state is shown in FIG. 12. An unique characteristic of this rolling step is that the work piece 1 has a diameter almost equal to that of the resultant flange portion shown in FIG. 1 and is V-grooved while being reduced in diameter, while at the same time concaves and convexes are formed on the opposite side from the poly-V grooves.

Referring now to FIGS. 11 and 12, the numeral 40 denotes a rotating table with a guide pin 41 provided centrally. The illustrating state is obtained by placing the work piece 1 on the rotating table through its central hole and then moving down the die members 42–47 from their raised positions. Of the die members 42–47, a clamping die 42 first clamps the bottom portion of the work piece 1 to the table 40. The clamping die 42 is attached to a rotating shaft 47 through a holder 46 so that it can rotate while pressing the bottom portion of the work piece. A movable die 43 disposed outside the clamping die 42 is slightly movable downward, but is held in a position defined by an elastic member 45 such as rubber. The movable die 43 is formed with an uneven groove-forming portion 48 in the lower portion thereof. A pressure die 44 which surrounds the movable die 43 can be pressurized during rotation. The reference numeral 50 denotes a pressure roll or rolling die which is axially movable but urged upwardly and held in place by spring 51.

In the state just before starting operation, as illustrated on the left-hand side of FIG. 11, the pressure roll 50 is held in a predetermined position by the spring 51. The work piece 1 is clamped by the clamping die 42 between the latter and the rotating table 40. Further, the pressure die 44 engages and strongly presses on an end portion 49 of the work piece 1. In this state, the die members 42–47, the rotating table 40, the guide pin 41 and the work piece 1 are rotated together and the roll 50 is advanced toward the rotational center. By so doing, first the diameter of the work piece 1 is reduced. FIG. 12 shows a state in which the diameter of the V groove portion has been reduced to form a flange portion on the free end and the inner periphery of the cylindrical portion of the work piece 1 comes into contact with the outer periphery of the movable die 43, so that axially extending grooves or concaves and convexes begin to be formed on this portion of the work 1. During the balance of the V grooving operation, the concaves and convexes become deeper until the desired shape is obtained by the cold-working of the metal.

At this point in the forming process, there arises the following problem. According to experimental results, in the condition of FIG. 12 the inward flange portion (the portion indicated at 5 in FIG. 1) is not complete. For forming a complete flange portion it is necessary that the cylindrical portion of the work piece 1 be moved further downward. The force for this movement is received from the pressure die 44, but the inner periphery of the cylindrical portion of the work 1 is in a tight engagement with the uneven groove-forming portion 48 of the movable die 43, so if the movable die 43 does not move then the pressure of the pressure die 44 does not readily cause movement downward, resulting in lack of uniformity in the vertical direction.

In order to solve the above-mentioned problem, according to this embodiment of the present invention, from the condition shown is FIG. 12 the movable die 43 starts moving downward while compressing the elastic member 45. At this time, the pressure of the elastic member 45 is much lower than that of the pressure die 44, so the influence of the pressure of this elastic member is negligible. In this way, the movable die 43 permits the rolling operation to be carried out while maintaining the pressure of the pressure die 44 as uniform as possible. However, where the number of V grooves is small, the movable die 43 may be omitted, leaving only the clamping die 42.

At the end of the rolling operation, the movable die 43 is located at the lowermost position while compressing the elastic member 45 as shown on the right-hand side of FIG. 11.

Figure 2:
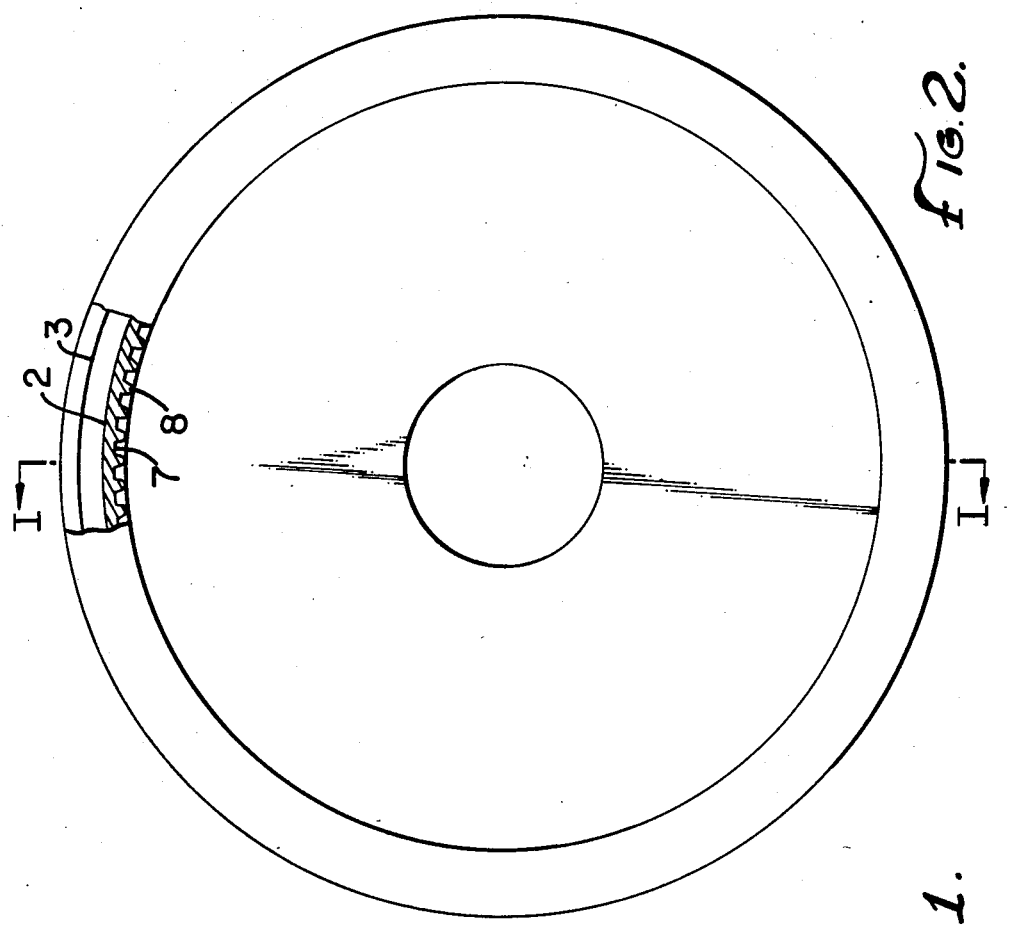
FIG. 2 is an end elevation view of the poly-V pulley of FIG. 1 with a portion in section taken substantially on the line II—II in FIG. 1.

As the roll 50 is returned to its original position from the state shown on the right-hand side of FIG. 11 and the upper dies are pulled up, the work piece 1 follows them. In the final stage, the pressure die 44 is moved in the downward direction relative to the clamping die 42 and the movable die 43, whereby the rolled product is ejected. In this way, a poly-V pulley having concaves and convexes on the back side of the cylindrical portion as shown in FIGS. 1 and 2 is completed.

Figure 13:
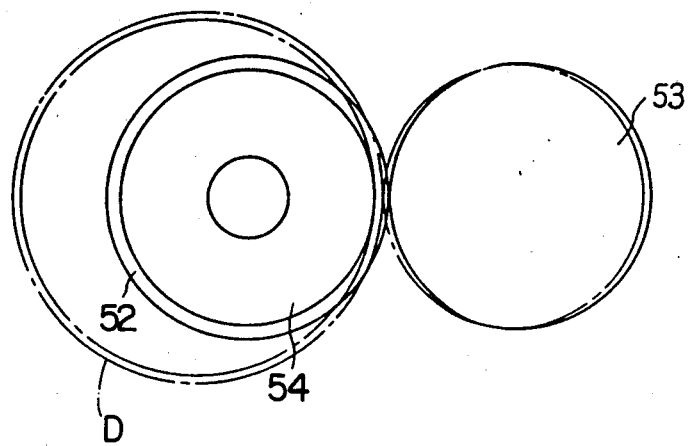
FIG. 13 is a diagrammatic illustration of a rolling die forming step for illustrating the tendencies normally caused by such forming.
Figure 14:
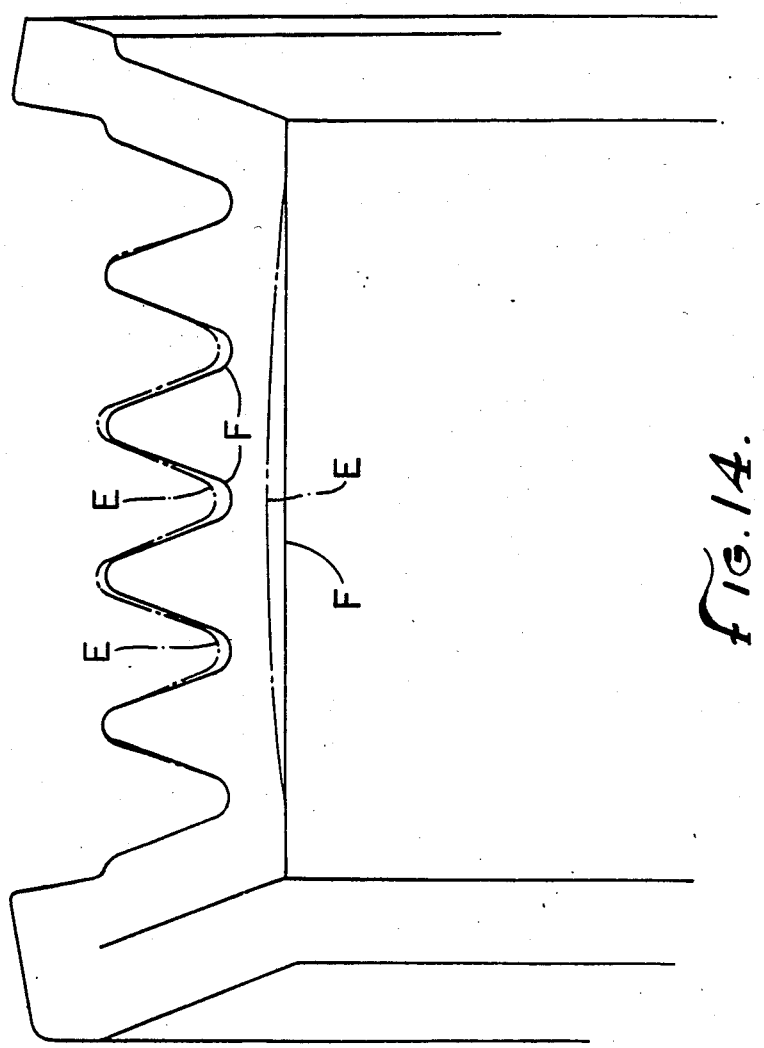
FIG. 14 is an enlarged fragmentary sectional elevation view, with the cross-hatching omitted for clarity, of the poly-V pulley of this invention with phantom lines illustrating the undesirable shape that would occur without the use of the present invention.

The importance of the concaves and convexes formed on the inner peripheral portion at the back of V grooves to improve the processing accuracy of the grooves will be explained with reference to FIGS. 13 and 14. Consider a processing operation in which, as shown in the explanatory view of FIG. 13, a cylindrical work piece 52 of a narrow width is formed by cutting a pipe and is fitted around a core bar 54 whereupon the core bar is rotated while a plane roll 53 is engaged strongly with the cylindrical work piece 52 to cause plastic deformation or cold-working. This operation is obviously a rolling operation in which the diameter of the cylindrical work 52 increases as its wall becomes thinner, as shown in phantom line D. In contrast therewith, in the rolling of the poly-V pulley, the diameter is restrained at the flange portion on either side of the V grooves, so in this vicinity the diameter cannot be changed by rolling. However, at the central portion where this restraining force is weak, there is a natural tendency for the diameter to be increased by rolling. This condition is shown in FIG. 14, in which the solid lines F represent the designed shape, but what would be actually formed is indicated by the phantom lines E.

By forming concaves and convexes on the inner peripheral portion at the back of V grooves according to the present invention, there are obtained the following effects. Firstly, the increase in diameter of the central portion is kept to a minimum because thinning in the rolling step is suppressed, and the angular accuracy is improved. Further, by the provision of such concaves and convexes, the irregularity of the V groove shapes caused by an insufficient accuracy of the thickened rolled portion of the work is absorbed by the concaves and convexes. According to the results of tests actually conducted using 5-V-groove pulleys each having an outside diameter of 120 mm, the maximum angular error was ±3° in the case of a conventional pulley free of concaves and convexes, while it was ±1° in the case of a pulley having concaves and convexes according to the present invention. This means that the presence of such concaves and convexes is very effective. Since the above tests have been conducted for the purpose of comparison, it is believed possible to attain an even higher degree accuracy by selecting improved rolling conditions and by making further improvements.

The invention claimed:

1. A method of forming a poly-V pulley from a cup-shaped sheet metal work piece of substantially uniform wall thickness having a cylindrical wall portion, comprising the steps of axially compressing the cylindrical wall portion while supporting substantially the entire circumference of the internal and external surfaces of the cylindrical wall portion to prevent buckling and allowing controlled radial expansion of at least one surface to cold form a thickened central portion of the cylindrical wall portion and maintain substantially the same thickness of the axial ends of the cylindrical wall portion on either side of the central portion, and roll forming the thickened cylindrical wall portion to simultaneously form poly-V grooves on the external surface and axially extending convexes and concaves on the internal surface.

2. The method of claim 1 wherein the roll forming step reduces the diameter of the thickened cylindrical wall portion.

3. The method of claim 1 wherein the roll forming step forms outwardly extending flanges on each axial end of the thickened cylindrical wall portion.

4. The method of claim 1 wherein the controlled radial expansion is of the external surface only.

5. The method of claim 1 wherein the roll forming step includes, in a continuous series of operations, first reducing the diameter of the thickened cylindrical wall portion while forming an outward extending flange on the free end of the cylindrical wall portion, next forming the poly-V grooves and convexes and concaves, and then forming an outwardly extending flange on the other end of the cylindrical wall portion.

6. The method of claim 5 wherein the controlled radial expansion is of the external surface only.

7. The method of claim 1 wherein substantially the entire circumference of the internal surface at the thickened portion is supported during roll forming of the axially extending convexes and concaves thereon.

8. The method of claim 1 wherein the poly-V grooves and axially extending convexes and concaves are roll formed immediately following the roll forming of an outwardly extending flange from at least one of the axial ends.

9. The method of claim 8 wherein substantially the entire circumference of the internal surface is supported during the roll forming of the axially extending convexes and concaves.

10. The method of claim 9 wherein the internal surface is supported by a die having a cylindrical external surface with axially extending convexes and concaves.

11. The method of claim 1 wherein the axial ends of the cylindrical portion are maintained in substantially the same cylindrical condition during the axial compressing that forms the thickened central portion, and the axial ends are formed into outwardly extending flanges during the roll forming.

12. A method of making a poly-V pulley formed of sheet metal, which method comprises the steps of subjecting the sheet metal to a deep drawing to form a bottomed cylinder having an outside diameter almost equal to that of the flange portions to be formed at both ends of the poly-V pulley upon finishing, placing under restraint all of the inner and outer peripheral surfaces of the cylindrical portion and inside and outside of the bottomed portion to maintain the thicknesses thereof except a central portion of the cylindrical portion which central portion is to be thickened, disposing a split die at the portion to be thickened, said split die being capable of changing its diameter, shifting the sheet metal material to the portion to be thickened while compressing the cylindrical portion in the axial direction and while applying to the split die a pressure in the radial direction to such an extent as to avoid bending and bulging of the material, thereby forming a thickened portion, then clamping the bottom portion of the bottomed cylinder thus formed with the thickened portion, rotating the cylinder while pressing end portions of the cylindrical portion strongly in the axial direction, pressing a processing roll against the outside of the cylindrical portion, said processing roll being initially held in a predetermined position and then gradually movable in the axial direction, thereby reducing the diameter of the area of the cylindrical portion which is in pressure contact with said processing roll, forming flange portions at both ends of the cylindrical portion, then bringing a movable die having concaves and convexes corresponding to the inner periphery on the back side of the cylindrical portion into contact with said inner periphery to form concaves and convexes thereon, and at the same time forming V grooves on the outer peripheral surface of the cylindrical portion by means of the processing roll.

* * * * *